Nov. 6, 1951   J. BLATCHFORD   2,573,759
ANIMAL TRAP
Filed March 20, 1948   2 SHEETS—SHEET 1
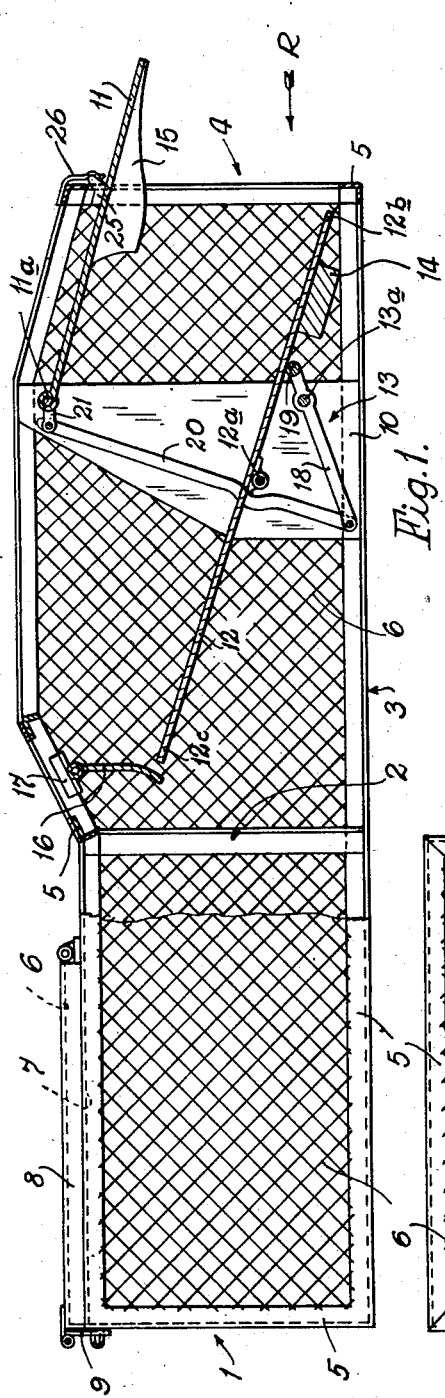
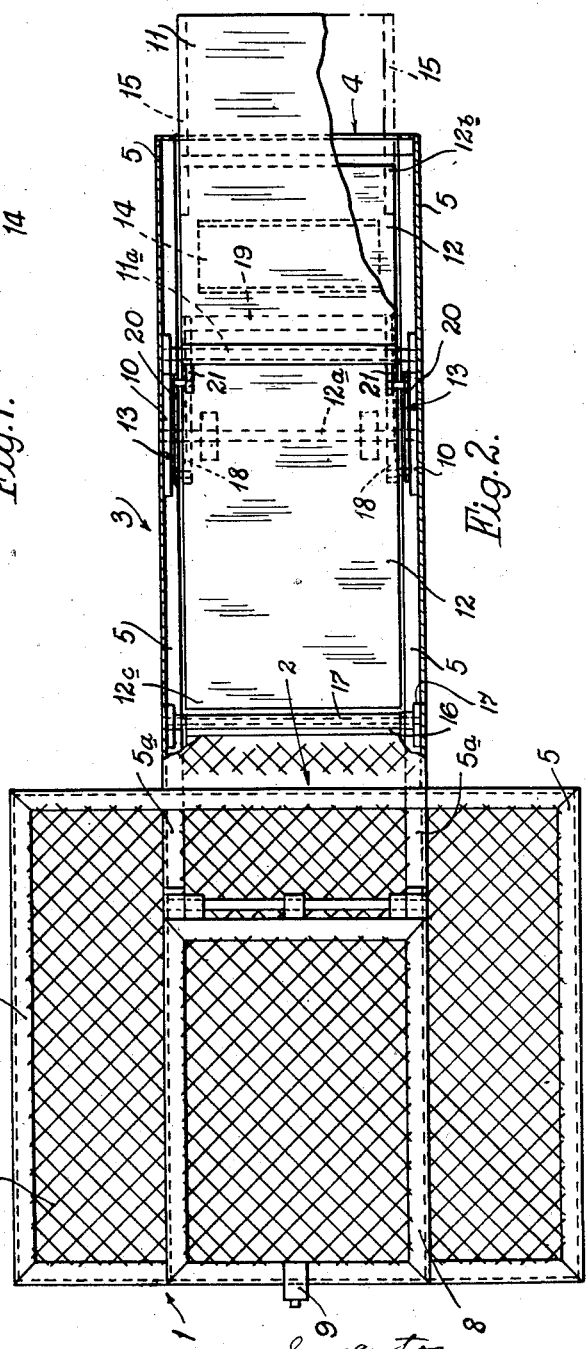
Inventor
John Blatchford
By Thomas W. Clark
Attorney

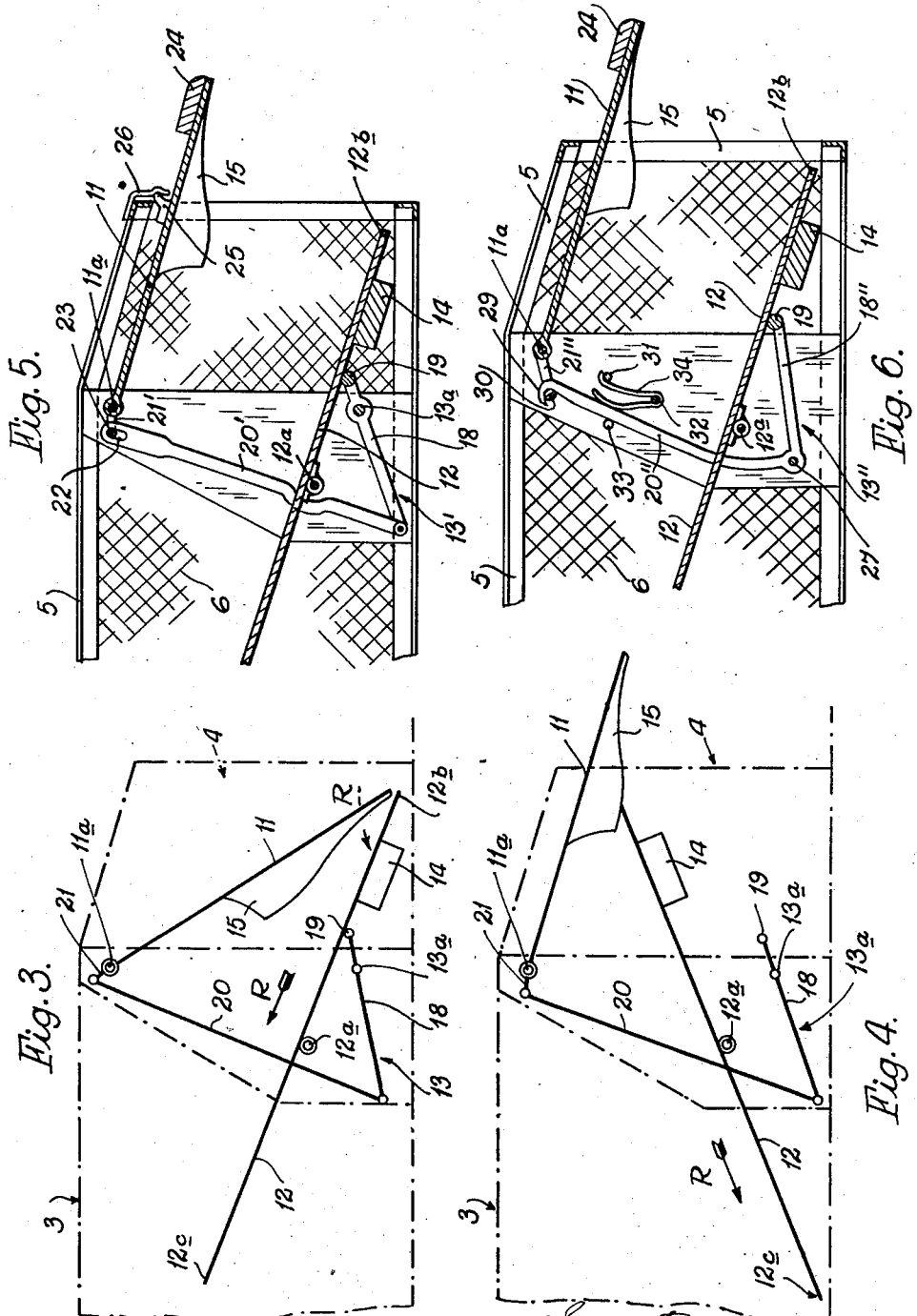

Patented Nov. 6, 1951

2,573,759

UNITED STATES PATENT OFFICE 2,573,759

ANIMAL TRAP

John Blatchford, Shobrooke, Crediton, England

Application March 20, 1948, Serial No. 16,133
In Great Britain March 28, 1947

14 Claims. (Cl. 43—76)

The present invention relates to apparatus for trapping animals, birds and like creatures and has for its primary object to provide a modified and improved trap of the self-closing and self-re-setting type.

According to the present invention the apparatus comprises a cage, box or other enclosure, hereinafter referred to as a cage, in which is located a tiller or treadle member pivoted intermediate its ends to provide a tilting floor in a trapping runway and biassed so as normally to tilt downwards towards the trapping entrance to the runway, a closure means adapted to close the trapping entrance and alternatively to be maintained in a position which leaves the trapping entrance open, and a lever system which is operatively associated with the said closure means and adapted to be operated by the tiller or treadle member, the parts being arranged and inter-related so that the forward or entry end of the tiller or treadle is adapted to be depressed incidental to the weight of a creature resting thereon thus to cause the closure member to shut the trapping entrance to the runway and trap the creature therein, and furthermore to rise as the trapped creature moves along the tiller and towards the rear end thereof and in thus rising to re-set the closure member in the open position while causing the trapped creature to move away from the tiller and pass to another part of the cage.

According to one feature of the invention the tiller or treadle may be adapted automatically to re-assume its normal position of downward inclination towards the trapping entrance end of the cage when the rear end thereof is relieved of the weight of the creature and thus re-set ready to be depressed at its forward end in order to initiate the re-closing of the trapping entrance should the trapped creature move back therealong towards the said entrance.

According to another feature of the invention, the tiller or treadle may be arranged so that when it re-assumes its normal setting the rear end thereof is rendered inaccessible to the creature trapped in the rear or main part of the cage and the tiller itself then forms in effect a closure member which prevents the trapped creature from leaving the cage by passage through the trapping entrance.

In order that the invention may be clearly understood and readily carried into effect, several constructional embodiments thereof will now be described, by way of example and without implied limitation, with reference to the accompanying drawings in which:

Fig. 1 is a part sectional, side elevation of one form of the invention embodied in a portable trap which is well adapted for trapping rabbits, rats or like rodents;

Fig. 2 is a part sectional plan view thereof;

Figs. 3 and 4 are diagrammatic line views showing alternative operative positions of the trapping mechanism embodied in Figs. 1 and 2, while Figs. 5 and 6 are fragmentary, sectional detail views of alternative forms of trapping mechanisms for carrying the invention into effect.

In the constructional form shown in Figs. 1 and 2 of the drawings, the trap comprises a rectangular main cage 1 having an opening 2 in one side thereof from which extends a comparatively narrow, elongated, rectangular vestibule or trapping runway 3 having its outer end left open to provide the trapping entrance 4 of the apparatus.

The cage 1 and the trapping runway 3 are conveniently constructed as a framework formed of lengths of metal strip or angle section 5 secured together, for example by welding, and having the top, bottom and sides thereof covered by wire mesh 6. The cage 1 is provided in the top thereof with a hatch opening 7 closured by a hatch cover 8 which is hinged at its inner end to the top frame longitudinals 5a and releasably secured at its outer end to the rear end of the cage 1 by catch means 9.

The outer or front end of the trapping runway 3 is provided with bearer plates 10 which extend between and are secured to the upper and lower frame longitudinals 5 to provide upright side supports for the trapping mechanism comprising the pivotal closure flap 11, treadle or tiller 12 and inter-connecting linkage 13, which are pivotally mounted upon axles or spindles 11a, 12a, and 13a respectively. The said spindles extend across the trapping runway 3 in mutually parallel relation and substantially parallel to the bottom or floor of the runway 3 and have their ends supported by the bearer plates 10.

The closure flap 11 is pivoted to the upper ends of the bearer plates 10 so as to extend above and clear of the trapping entrance 4 when in the raised position shown in Fig. 1, and to extend across the trapping entrance when lowered to the inclined position shown in Fig. 3.

The treadle or tiller 12, hereinafter referred to as the tiller, is pivoted intermediate its ends upon the spindle 12a which is mounted in the lower parts of the bearer plates 10 so that the tiller may be tilted to bring the forward end 12b thereof to a position slightly above the bottom edge of the trapping entrance 4, e. g. between one and two inches above the said bottom edge as shown in Fig. 1, and alternatively rocked or tilted in the opposite sense of rotation to bring the rear end 12c thereof to a similar position in relation to the bottom of the rear end of the runway 3 as shown in Fig. 4. The tiller 12 is biassed by suitable disposition of its pivotal axis in relation to its length and/or by the counter-weighting mass 14, as shown, so as normally to assume the position of downward inclination towards the trapping entrance 4 as shown in Fig. 1.

The forward end 12b of the tiller 12, in rising to the position shown in Fig. 4, is adapted to engage the lower cammed edges of the thrust plates 15 of which are secured to and project downwards from the side edges of the closure flap 11.

A baffle plate 16 is pivotally secured by hinge brackets and hinge pin 17 to the top members 5 of the cage framework so as to extend across the cage and freely to hang in and close the gap between the top of the cage and the raised end 12c of the tiller 12 when the latter is positioned as shown in Fig. 1. The lower edge of the baffle plate 16 is outwardly curved or cammed to ensure the deflection of the plate from the path of the rising rear end 12c of the tiller.

The linkage 13 comprises a pair of levers 18 fulcrumed intermediate their ends on the spindle 13a and having a transverse bar 19 extending between and carried by the forward ends thereof so as to lie beneath the forward end of the tiller 12. The rear ends of the levers 18 are pivotally connected by upwardly extending links 20 to short arms 21 which are rigidly secured to, or formed integral with, the bearing knuckle of the closure flap 11. The parts are proportioned and arranged so that the weight of the closure flap 11 is counterbalanced by the inertia of the linkage 13.

In the constructional form of the invention as above described the tiller 12 is adapted to form the tiltable floor of a tunnel-like runway 3 leading from the trapping entrance 4 to the main cage 1 and, as above mentioned, the forward end of the tiller rises slightly above the lower edge of the trapping entrance when the trapping mechanism is normally set as shown in Fig. 1.

In the operation of the trapping apparatus which is of a portable nature, the cage and runway are disposed with the floors thereof substantially horizontal and with the opening trapping entrance of the runway in the run of the creatures e. g. rabbits or other rodents to be trapped. As the creature, represented by arrow R in the drawings, steps on to the lower, forward end of the tilted tiller, the said forward end of the tiller is depressed by the weight of the creature and the thrust of its limbs, and in turn depresses the transverse bar 19 and rocks the levers 18 in clockwise direction as shown in Fig. 3. The links 20 are thereupon raised by the levers 18 and serve to move or permit the movement of the closure flap 11 in clockwise direction, so that the closure flap sweeps downwards to assume the position shown in Fig. 3 thereby closing the trapping entrance 4, and trapping the creature in the forward end of the trapping runway 3. Incidentally, it will be understood that if the flap sweeps downwards before the creature has properly passed through the trapping entrance, the flap will contact the rear end of the creature which will thereupon bound forward with fright and thus complete its entry into the trap.

The linkage 13 will serve to lock the closure flap 11 in the lowered position shown in Fig. 3, as long as the tiller 12 is retained in the forwardly tilted position by the weight of the creature resting thereon, so that the latter cannot escape from the trap by backing against the flap and retreating through the trapping entrance.

As the trapped creature moves along the tilted tiller its weight will pass across the pivotal axis of the tiller from the forward to the rear end of the tiller which thereupon will tilt in an anticlockwise direction to assume the position shown in Fig. 4. The creature will thereupon run and/or slide down the tilted tiller and thus enter the main cage 1 through the opening 2. Should the creature contact the depending baffle plate 16 the latter will yield rearwardly and re-assume its normal position when the creature has passed into the cage 1. Immediately upon being relieved of the weight of the creature, the rear end 12c of the tiller will rise as the latter tilts to the normal position shown in Fig. 1 and, in conjunction with the baffle plate 16, will form a closure for the opening 2 of the main cage 1.

In the rearward movement of the tiller, the forward end 12b rises whilst in contact with the cammed plates 15 thus lifting the pivotal flap 11 and restoring the latter to the raised or open position shown in Fig. 4 in which position the counterbalanced flap remains, when the tiller returns to the normal forwardly tilted position shown in Fig. 1. Thus, the trapping mechanism is re-set to the normal, open position in readiness for the next victim, while the creature already trapped in the cage 1 is secured therein by the raised rear end 12c of the tiller.

Creatures trapped in the cage 1 may be dealt with and removed therefrom through the hatch opening 7 after the hatch cover 8 is unfastened and swung back to uncover the said hatch opening.

In the modifications of the trapping mechanism shown in Figs. 5 and 6, those parts which are similar to the parts shown in Figs. 1–4 are indicated by similar references, while modified parts are indicated by similar but primed references.

In the arrangement shown in Fig. 5, means are provided for enabling the pivotal closure flap 11 to be operated by gravity with a rapid, snap action and to this end, the linkage 13', which is adapted to be energised by the tiller 12 in the manner described above, is modified by providing the upper ends of the links 20' with slots 22 which slidably receive laterally projecting pins 23 carried by the arms 21' which are rigidly secured to the bearing knuckle of the flap 11. A weight 24 is secured to the free end of the flap 11 in order to render the downward movement of the flap more positive and a latch bolt 25 is secured to the outer surface of the flap for engagement with a spring catch 26 when the flap is fully raised.

In the last described form of trapping mechanism, the depression of the forward end of the tiller will raise the links 20', but the clearance slots 22 will permit the links to move without displacing the flap 11, until the lower ends of the slots 22 contact the pins 23 whereupon the flap 11 will be forced downwards sufficiently to trip the latch bolt 25 from the spring catch 26 and the closure flap will then drop into position to close the trapping entrance.

In the completion of the operative cycle of the trapping mechanism, the closure flap 11 will be restored to the raised position as the tiller 12 tilts rearwardly and the latch bolt 25 will re-engage the spring catch 26 to retain the closure flap in the raised position, while the linkage 13' will be restored to the position shown in Fig. 5 after the pins 23 engage the lower ends of the slots 22.

It will be clear that the spring latch means 25, 26 may be used, if desired, in the constructional embodiment of the invention shown in Figs. 1-4. It is best illustrated in Fig. 1, for the purpose of temporarily retaining the closure flap in the raised or open position.

In the modified form of trapping mechanism shown in Fig. 6 the linkage 13'' is modified to provide a pair of bell crank arms 18'', 20'' which are pivotally mounted upon a rocker shaft or spindle 27 supported at its ends by the bearer plates 10.

The free, upper ends of the bell crank arms 20'' are formed as hook-like catches 29 which are adapted to engage pins 30 projecting laterally from the short arms 21'' which are rigidly secured to the bearing knuckle of the closure flap 11. The hooked arms 20'' are located in operative position in relation to the pins 30 by stops 33 mounted on the inner faces of the bearer plates 10, and are resiliently held in said operative position by means of U-shape blade springs 34 mounted upon the bearer plates 10 so as to re-act between the bell crank arms 20'' and stops 31 fixed to the plates 10. The outer ends of the catches 29 are cammed for sliding engagement with the pins 23.

In the operation of the last mentioned form of the trapping mechanism, when the forward end 12b of the tiller 12 is depressed by the weight of the creature resting thereon the bell cranks 18'', 20'' are rocked slightly in clockwise direction against the force of the springs 34, thus withdrawing the catches 29 from egnagement with the pins 30 whereupon the closure flap 11 is permitted to fall. When the closure flap 11 is raised by the rearwardly tilting tiller, the pins 30 carried by the arms 21'' are pressed upon the cammed tops of the catches 29 which are slightly deflected against the springs 34 in the manner of spring latches and thereafter caused to engage the pins when the latter are restored to the position shown in Fig. 6.

The platelike members such as the closure flap 11, treadle 12, bearing plates 10 and baffle plate 16 may, with advantage, be made of light gauge sheet metal, while some part or all of the walls of the cage and/or runway may also consist of solid sheet material, e. g. light gauge sheet metal, if so desired.

Many modifications of the above described constructional forms of the invention may be made within the scope of the appended claims and in this connection it may be mentioned, by way of example, that each or selected ones of the operative parts of the trapping mechanism may be spring-loaded if so desired.

I claim:

1. Apparatus for trapping animals, birds and like creatures comprising a box-like enclosure, a trapping runway providing an entrance to said enclosure, a tiller member pivoted to provide a tilting floor in said trapping runway, said tiller member being biased so as normally to tilt downwards towards the outer entrance to said trapping runway, a closure means pivoted adjacent its inner end, having a swinging outer end adapted to swing down into and close said trapping entrance and alternatively to be maintained in an outer, upper position to leave said trapping entrance open, cammed thrust plates on the closure means engageable by the outer end of the tiller, to open the closure means by upward movement of the said tiller end thereagainst and a lever system which is operatively associated with the said closure means beyond its inner pivoted end and adapted to be operated by the tiller member, the parts being arranged and inter-related so that the forward or entry end of the said tiller member is adapted to be depressed incidental to the weight of a creature resting thereon thus to cause the said closure member to shut downwardly and inwardly to close the trapping entrance to the runway and trap the creature therein, and furthermore to rise as the trapped creature moves along the said tiller towards the rear end thereof and in thus rising to re-set the closure member in the open position while causing the trapped creature to move away from the said tiller and pass to another part of the cage.

2. Apparatus as claimed in claim 1, wherein the said tiller is independently balanced so as automatically to reassume its normal position relative to the outer entrance of the said trapping runway when the rear end of the tiller is relieved of the weight of the creature and is thus re-set ready to be depressed at its forward end in order to effect the closing of the said trapping entrance.

3. Apparatus as claimed in claim 1, wherein the said closure means comprises a pivotal gravity flap which is connected to the said lever system and counterbalanced by the inertia of the said system so that the said closure flap will remain raised and withdrawn from the trapping entrance until lowered in the displacement of the lever system by the said tiller.

4. Apparatus as claimed in claim 1, wherein the lever system comprises means for locking the closure means in the position assumed by the said closure means to close the said trapping entrance during such time as the said tiller remains depressed by the weight of the creature thereon.

5. Apparatus as claimed in claim 1, wherein the said closure means comprises a pivotal gravity flap, means for connecting said pivotal gravity flap to the said lever system, spring catch means for retaining said pivotal gravity flap in a raised position withdrawn from the said trapping entrance, and means for tripping said spring catch means through the medium of said lever system thus to permit the said pivotal gravity flap to move into position to close the said trapping entrance.

6. Apparatus as claimed in claim 1, wherein the closure means comprises a pivotal gravity flap, latch means adapted to retain said pivotal gravity flap in a raised position withdrawn from the trapping entrance, and means for controlling said latch means by the said lever system in such a manner that upon displacement of the said lever system by depression of the said tiller the said latch means are operated to release the said closure flap so that the said flap can move into position to close the said trapping entrance.

7. Apparatus for trapping animals, birds and like creatures, comprising a main cage with an entrance thereto, a trapping runway having an outer trapping entrance and arranged to lead to the entrance of said main cage, a tiller member pivoted upon an axis extending across said runway so that said tiller member forms a tilting floor to said runway, said tiller member being arranged so as normally to tilt downwardly towards said trapping entrance to said runway and alternatively to be downwardly inclined towards the entrance to said main cage, a closure means pivoted adjacent its inner end and having a swinging outer end adapted to swing down into and close the trapping entrance and alternatively to be maintained in an outer, upper position which leaves the trapping entrance open, and a lever system which is operatively associated with the said closure means inwardly beyond its inner pivoted end and adapted to be operated by the tiller member, the parts being arranged and interrelated so that the forward or entry end of the said tiller member is adapted to be depressed incidental to the weight of a creature resting thereon thus to cause the said closure member to shut the trapping entrance to the runway and trap the creature therein, and furthermore to rise as the trapped creature moves along the said tiller towards the rear end thereof and in thus rising to re-set the closure member in the open position while causing the trapped creature to move away from the said tiller and pass through the said entrance to said main cage.

8. Apparatus as claimed in claim 7, wherein said tiller member when tilted towards said trapping entrance serves to close the said entrance to said main cage.

9. Apparatus as claimed in claim 7, wherein the said tiller is independently balanced so as automatically to reassume its normal position relative to the outer entrance of the said trapping runway when the rear end of the tiller is relieved of the weight of the creature and is thus re-set ready to be depressed at its forward end in order to effect the closing of the said trapping entrance.

10. Apparatus as claimed in claim 7, wherein the said closure means comprises a pivotal gravity flap which is connected to the said lever system and counterbalanced by the inertia of the said system so that the said closure flap will remain raised and withdrawn from the trapping entrance until lowered in the displacement of the lever system by the said tiller.

11. Apparatus as claimed in claim 7, wherein the lever system comprises means for locking the closure means in the position assumed by the said closure means to close the said trapping entrance during such time as the said tiller remains depressed by the weight of the creature thereon.

12. Apparatus as claimed in claim 7, wherein the said closure means comprise a pivotal gravity flap, means for connecting said pivotal gravity flap to the said lever system, spring catch means for retaining said pivotal gravity flap in a raised position withdrawn from the said trapping entrance, and means for tripping said spring catch means through the medium of said lever system thus to permit the said pivotal gravity flap to move into position to close the said trapping entrance.

13. Apparatus as claimed in claim 7, wherein the closure means comprises a pivotal gravity flap, latch means adapted to retain said pivotal gravity flap in a raised position withdrawn from the trapping entrance, and means for controlling said latch means by the said lever system in such a manner that upon displacement of the said lever system by depression of the said tiller the said latch means are operated to release the said closure flap so that the said flap can move into position to close the said trapping entrance.

14. Apparatus as claimed in claim 7, including means operating independently of the lever system to open said closure means with the passing of a creature inwardly along said tiller.

JOHN BLATCHFORD.

REFERENCES CITED

The following references are of record in the file of this patent:

UNITED STATES PATENTS

| Number | Name | Date |
|---|---|---|
| 488,111 | Bromwell | Dec. 13, 1892 |
| 513,184 | Henry | Jan. 23, 1894 |
| 997,841 | McAtee | July 11, 1911 |
| 1,017,227 | McAtee | Feb. 13, 1912 |
| 1,721,653 | Winkler | July 23, 1929 |